(No Model.)
J. McFARLANE.
TOY VELOCIPEDE.
No. 513,815. Patented Jan. 30, 1894.
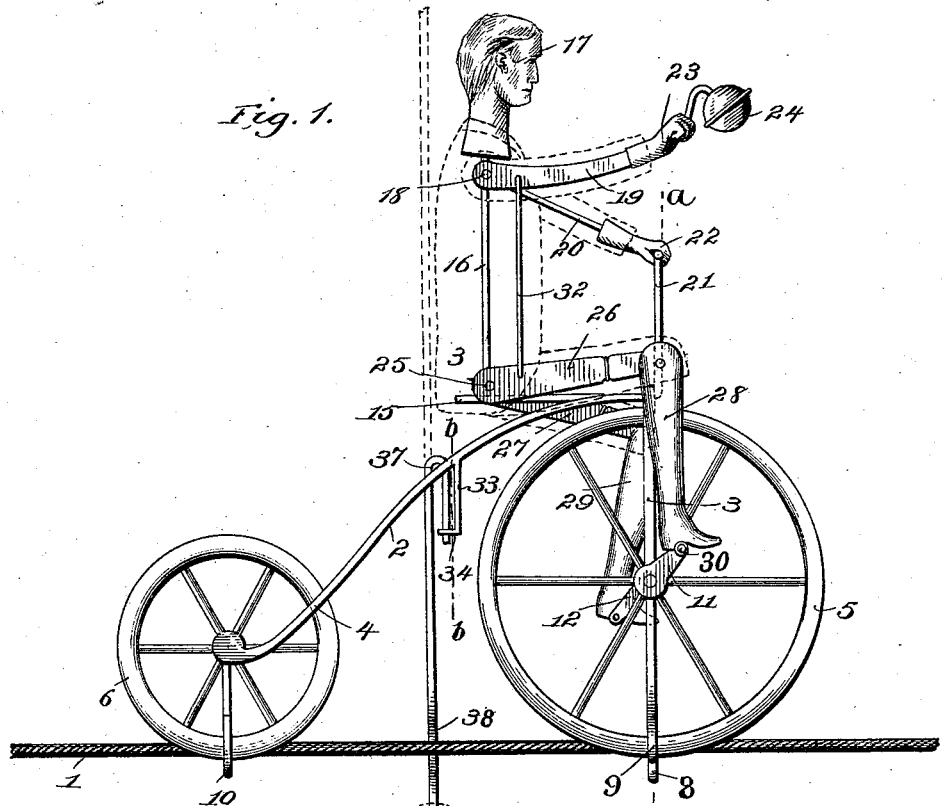
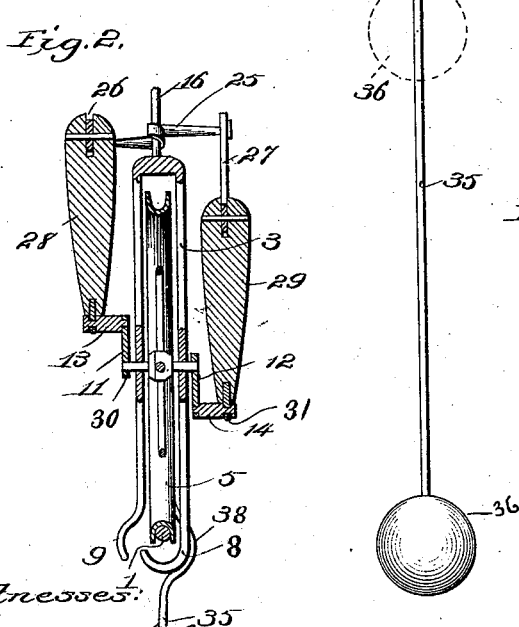
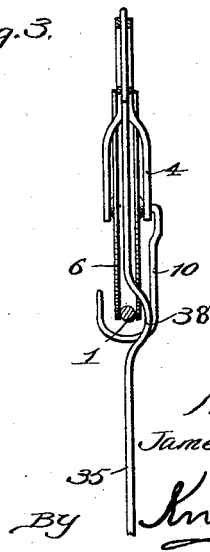
Witnesses:
Harry F. Rohrer
Geo. E. Cruse
Inventor:
James McFarlane
By Knight Bros.
Attys
THE NATIONAL LITHOGRAPHING COMPANY,
WASHINGTON, D. C.

UNITED STATES PATENT OFFICE.

JAMES McFARLANE, OF GLASGOW, SCOTLAND.

TOY VELOCIPEDE.

SPECIFICATION forming part of Letters Patent No. 513,815, dated January 30, 1894.

Application filed February 27, 1893. Serial No. 463,864. (No model.)

*To all whom it may concern:*

Be it known that I, JAMES MCFARLANE, a subject of the Queen of Great Britain, residing at 21 Steven Street, Glasgow, in the county of Lanark, Scotland, have invented certain new and useful Improvements in Toy Velocipedes, of which the following specification, taken in connection with the accompanying drawings, is a full, clear, and exact description, such as will enable those skilled in the art to make and use the same.

My invention relates to improvements in that style of toy bicycles which are adapted to be propelled back and forth on a cord or rope, the wheels being formed with deep grooves to embrace the cord or rope and a depending weight being provided for supporting the bicycle in equilibrium; and my invention consists in certain features of construction which will first be described with reference to the accompanying drawings and afterward particularly pointed out in the claims.

In said drawings:—Figure 1 is a side elevation of my improvement representing the same in operative position. Fig. 2 is a sectional view taken on the line $a$—$a$ Fig. 1. Fig. 3 is a sectional view taken on the line $b$—$b$ Fig. 1.

1 is the supporting cord or rope upon which the bicycle and its surmounting figure travel back and forth.

The bicycle is formed of the backbone 2 suitably connected in front with the main fork 3, and formed integral with the rear fork 4.

5 is the front wheel journaled in the fork 3, and 6 is the rear wheel journaled in the fork 4. The side-pieces of the main fork 3 are extended below the rim of the wheel 5 to form the curved spring arms 8, 9, which are adapted to surround the supporting cord and prevent its slipping out of the groove of the wheel.

10 is a depending arm extending from the journal end of the rear fork 4 and having its end curved around the rim of the small wheel so as to hold the supporting cord in the groove. The curved spring arms 8, 9 and 10 are arranged to allow the cord to be inserted in the grooves by springing out of the way sufficiently, and afterward resuming their normal positions for holding the cord in place.

Keyed to the axle of the front wheel 5 are the cranks 11, 12, provided with the pedal pieces 13, 14, as clearly shown in Fig. 2.

15 is the bicycle seat rigidly secured at its forward end to the backbone 2.

Projecting up from the seat 15, is a rigid rod 16 forming the support for the riding figure.

17 is the head of the figure attached to the top of rod 16.

18 is a cross-rod secured to rod 16 and forming the shoulders of the figure.

19 and 20 are the arms which are pivotally attached to the ends of the rod 18.

21 is the handle bar supported from the backbone 2 above the front fork 3, and 22 is a hand on the arm 20 and attached to the handle bar 21 so as to represent the rider holding on. 23 is the other hand on the arm 19, in which is held a bell 24 or other toy.

25 is a cross-rod attached at its center to the vertical rod 16 and extending to each side to form the hips of the rider.

26 and 27 are the upper members of the rider's legs pivoted to the ends of the rod 25, and 28, 29, are the lower members of the legs pivoted to the ends of the upper members to form the knees and attached to the treadle pieces 13, 14, by means of eyes 30, 31.

32 is a rod pivotally connected to the legs 26 and arm 19 so as to move the arm up and down with the leg and ring the bell 24. The figure is completed by suitable clothing as represented in dotted lines in Fig. 1.

Formed integral with and depending from the backbone 2 at a point midway between its ends, is a plate 33 having a perforated right-angle extension 34 at its lower end.

Directly above the perforation or opening in the extension of the plate 33 is an opening through the backbone 2, and a little below this point is another opening which are for the purpose now to be explained.

35 is a metal rod having secured to its lower end a spherical weight 36, and provided at its upper end with the hook-shaped portion 37 which passes through the openings in the backbone 2 and the opening in the extension 34 of the plate 33 to detachably secure the rod thereto. The metal rod 35 is formed with a curved portion 38 at the point where it passes the cord so that the weight 36 may be held directly under the bicycle for keeping it always in equilibrium.

The above-described construction enables the weighted rod to be readily detached from the backbone of the bicycle, and slid up into the position shown in dotted lines in Fig. 1, so that when it is being packed for shipping the toy can be made to occupy a much smaller space than if it were rigidly attached thereto.

Having thus described my invention, what I claim as new, and desire to secure by Letters Patent, is—

1. In a toy bicycle, the combination of the backbone, the front and rear forks connected to said backbone, the grooved wheels mounted in said forks, and the depending curved spring arms for retaining the cord in the grooves of said wheels, substantially as set forth.

2. In a toy bicycle, the combination of the backbone and forks supporting the wheels, the depending weight, the seat attached to the backbone, the vertical rod attached to the seat for supporting the figure, the pivoted legs journaled to the treadles, the arms, and a rod connecting one of the legs to one of the arms, substantially as and for the purpose set forth.

3. In a toy bicycle, the combination of the backbone and forks, the grooved wheels, the cranks to the front wheel, the depending weighted rod, the handle bar and the riding figure comprising a vertical supporting rod, the legs and arms pivoted to said rods, the lower members of the legs journaled to the cranks, the rod connecting one of the arms with one of the legs, and the bell or other toy carried by said arm, substantially as set forth.

4. In a toy bicycle, the combination of the backbone, provided with the right-angled depending plate, front and rear forks provided with depending curved springs secured to said backbone, grooved wheels mounted in said forks, and a detachable weighted rod, provided with a hook-portion on its upper end for engaging with the backbone and depending plate substantially as shown as described.

5. In a toy bicycle, the combination of the backbone and forks carrying the front and rear wheels, with a depending weighted rod having a sliding connection with the backbone, substantially as and for the purpose set forth.

JAMES McFARLANE.

Witnesses:
JOHN LIDDLE,
*Patent Agent, Glasgow.*
ARTHUR HARTLEY YUILE,
154 *St. Vincent St., Glasgow.*